Aug. 7, 1962
W. N. WALKER
3,048,375
MEANS FOR CONTROLLING RADIANT HEAT LOSS OR GAIN
Filed Dec. 19, 1960
Fig. 1.
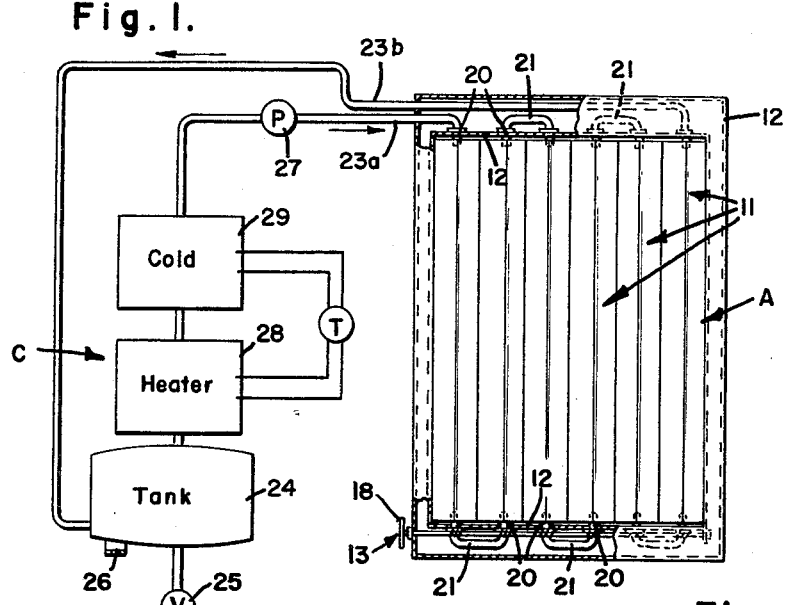
Fig. 2.
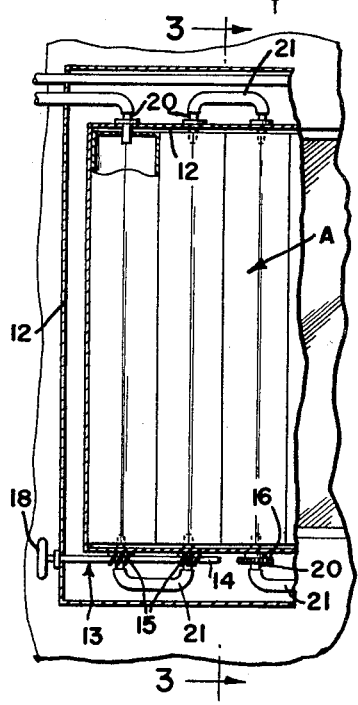
Fig. 3.
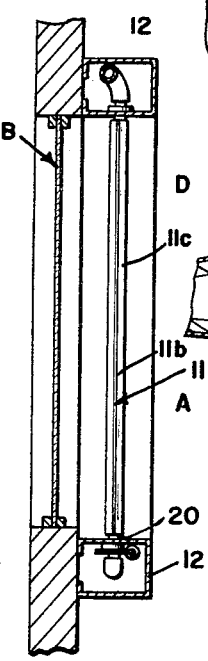
Fig. 4.
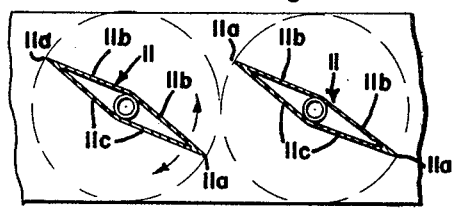
Fig. 5.
Fig. 6.
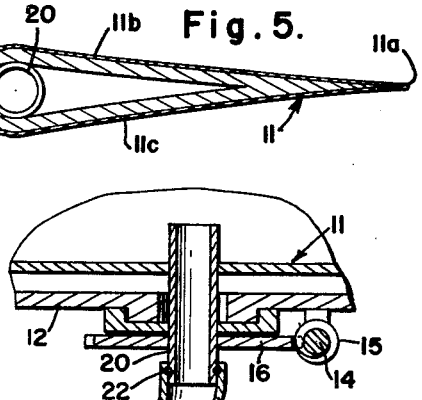
INVENTOR.
William N. Walker
BY Townsend and Townsend
attorneys … # 3,048,375
Patented Aug. 7, 1962

3,048,375
MEANS FOR CONTROLLING RADIANT HEAT LOSS OR GAIN
William N. Walker, Belmont, Calif., assignor to Radiant Ceilings, Inc., Burlingame, Calif.
Filed Dec. 19, 1960, Ser. No. 76,938
9 Claims. (Cl. 257—296)

This invention relates to means for controlling relative heat gain or loss between a heat transfer panel and a space area located to one side of said panel.

The particular embodiment of the invention which is illustrated in the drawings and which will be described in greater detail hereinafter comprises a combination adjustable heat baffle and heat exchanger assembly which is disposed between a heat transfer panel in a space area in reference to which it is desired to maintain temperature control. The combination baffle and heat exchanger assembly comprises hollow or tubular adjustable shutters or louvers moveable from a closed position, defining a substantially solid heat baffle area between the panel and the space, to an open position, defining relatively large areas of open passageways through which radiant heat gain or loss between the panel and the space can occur. The surfaces of the shutters which face the panel when the shutters are in closed position define reflective and substantially non-heat absorbent and/or emissive surfaces. The surfaces of the shutters which face the room area when the shutters are in closed position define relatively good heat emissive and heat absorbent surfaces. The hollow shutters are interconnected in series within a closed circuit of heat exchange fluid medium, such as, for example, water. The closed water circuit in turn includes a water heater and a water cooler which may be selectively alternatively actuated by a thermostatic or other control in reference to conditions existing in the temperature controlled space area.

As will more fully appear, by opening or closing the adjustable shutters, and/or by circulating through the shutters relatively hot or cold heat exchange fluids, it is possible to operate the present invention as a highly efficient and practical temperature control means.

It is contemplated that the present invention will have particular utility in controlling relative loss or gain of radiant heat energy of indoor living space areas, such as room spaces in residences, business offices, industrial plants, and the like. In this connection, the invention will be explained in particular reference to its application as a means for controlling radiant or solar heat gain and loss between an interior room space and a glass window—the latter defining a heat transfer panel within the more generic description of the invention as hereinafter described and claimed.

In its particular application is a thermal control device in conjunction with a glass window (or similar wall or ceiling heat transfer panel area) the combination baffle and heat exchange assembly may be installed within or adjacent the window casement frame in such manner that in appearance and mechanical operation, it resembles more conventional type light control louvered shutters or Venetian blinds.

In the exemplary embodiment to be described the tubular or hollow louvers are mounted for pivotal movement at their top and bottom ends about parallel vertical axes. The exterior surfaces of the louvers when in closed position are reflective and therefore define substantially non-heat absorbent and/or emissive surfaces. The interior surfaces of the louvers when in closed position define a matte finish, preferably of a darker color that will provide a relatively good heat emissive and absorbent surface. The louvers are interconnected to one another in series to define a closed circuit and through which either hot or cold water may be selectively alternatively pumped or otherwise circulated through the system depending upon various temperature control conditions within the room area.

By virtue of the particular arrangement of reflective and absorbent surfaces of the louvers together with the capability of being able to relatively open and close the louvers, in further conjunction with the ability to circulate either hot or cold water through the louvers, I am able to provide a highly efficient economical and practical way of controlling relative heat gain or loss within the room space.

The operability and flexibility of the invention may be readily understood by having reference to its two extreme conditions of use. Under one extreme condition of use, when it is desired to keep the room space cool in reference to the solar energy radiated through the glass heat transfer panel of the window, the louvers would be in fully closed position, and a coolant (e.g., cold water) would be circulated through the louvers. In this condition of operation the reflective exterior surfaces of the closed louvers will reflect a maximum amount of radiant heat back through the glass panel, and thereby the closed louvers function as a substantially solid heat baffle between the panel and the room space. As a consequence, a minimum amount of solar heat energy is permitted to pass through the louvers into the room space. Further, any radiant heat that is absorbed by the louvers is transferred by water convection to a water cooler in the system where the heat therefrom is dissipated at a rapid rate of heat transfer.

In an opposite extreme condition of use where it may be desired to heat the room space in reference to the relatively cooler heat transfer window panel, the louvers would again be tightly closed and a hot heat exchange liquid or fluid circulated therethrough. In this condition of operation, the non-reflective interiorly facing surfaces of the louver will function to emit or radiate heat into the room space from the hot circulating medium. On the other hand, the reflective surfaces facing the heat transfer glass panel will radiate or emit very little heat and will thereby curtail to a maximum reverse heat flow or heat loss to the panel. Additionally, of course, the closed shutters baffle direct radiant heat transfer from the warm room to the cooler window panel.

It is apparent that intermediate positions of operation can be practiced to obtain different conditions of temperature control between the heat transfer panel and the controlled temperature room space. Thus, for example, there will normally be occasions where it will not be necessary or desirable to circulate any heat exchange fluid through the louvers, and relative gain or loss of heat can be controlled solely through mechanical adjustment of the louvers to relatively open or closed positions. On other occasions, it may be desirable to partically or fully open the louvers in order to permit maximum access of light from the window, while maintaining temperature control primarily through circulation of either hot or cold circulating water.

From the foregoing it is apparent that a wide range of temperature control adjustments can be obtained from utilizing the present invention both in its capacity to function as an adjustable heat baffle as well as in its capacity to serve as a heat exchanger.

It is a principal object of the invention to provide a temperature regulating and control means of the character hereinabove mentioned and which is capable of operating in a highly efficient, practical and economic manner over prolonged periods of time, under rather extreme conditions of temperature variation, and in reference to a variety of specific applications of use and installation.

Other objects of the present invention will become apparent upon reading the following specification and referring to the accompanying drawings in which similar characters of reference represent corresponding parts in each of the several views.

In the drawings:

FIG. 1 is a vertical front elevational view of an embodiment of the invention with portions shown broken away and with the related heating and cooling system shown diagrammatically.

FIG. 2 is an enlarged fragmentary view of a portion of the unit shown in FIG. 1.

FIG. 3 is a vertical sectional view taken on line 3—3 of FIG. 2.

FIG. 4 is an enlarged fragmentary transverse sectional view showing the opening and closing movements of the louvers of FIG. 1.

FIG. 5 is an enlarged fragmentary sectional view of one of the louvers.

FIG. 6 is an enlarged fragmentary vertical sectional view of the lower pivotal mounting of one of the louvers and through which the water conduit from the closed circuit system connects to the interior of the louver.

Referring now more specifically to the drawings, the present invention is shown installed in reference to a conventional glass window through which radiant heat gain or loss will normally occur. A combination heat baffle and heat exchange assembly constructed in accordance with the invention is indicated generally at A; the heat transfer panel in the form of a glass window enclosure is indicated generally at B; and the closed circuit water cooling and/or heating system is indicated diagrammatically at C. The unit A in conjunction with the closed circuit system C is positioned adjacent and to the interior side of window B in order to control heat gain and loss from the window to the interior room surface D (see FIG. 3) over which is desired to maintain temperature control.

In the embodiment of the invention shown in the drawings, the combination heat exchanger and baffle assembly A comprises more specifically a plurality of vertical hollow metallic louvers or shutters 11 which are at their top and bottom ends within a frame support 12. As shown particularly in FIG. 4 the louvers in cross section are made elongate in reference to their thickness whereby when the louvers are pivotally moved to closed position such as shown in FIGS. 1 and 2, adjacent side edges 11a of the louvers will contact one another whereby there is presented a substantially solid heat baffle between the glass panel B and the room area D. As the louvers 11 are pivotally swung through 90° to open position, the space between the shutter or louvers 11 will increase whereby when the louvers are in fully open position large open passageways are formed whereby transmission of radiant heat energy from the panel B to the room space D and vice versa can readily occur.

Conventional mechanical control means such as indicated generally at 13 may be provided to simultaneously pivotally open and close the louvers to any desired adjusted position. The control mechanism as shown in the drawings comprises a control shaft 14 provided with worm-gear segments 15 in mesh engagement with ring-gears or pinions 16. The pinions 16 are non-rotatably affixed to the hollow pivot stub shafts 20 defining the axes about which the louvers swing. By rotating the control shaft 13 through manipulation of handle 18, the louvers can be opened and closed by virtue of the engagement between the pinion gears 16 with the worm-gear segments 15. It is appreciated that the particular control mechanism for opening and controlling movement of the louvers is considered to be a matter of engineering design and choice and no invention per se is claimed in reference to the particular operating mechanism shown and described therein.

It is also appreciated that in a fully automatic temperature control system, it may be desirable to operate the opening and closing of the louvers by power from a small electric motor which in turn may be actuated in reference to a master thermostatic control system. Again, such matters are considered to be a matter within the professional choice and skill of the art.

The louvers 11 are made of a relatively good heat conducting metal or other material such as, for example, extruded aluminum.

The surface 11b of the louvers which when in closed position face the window glass panel B are made substantially heat reflective so as to present surfaces which are relatively non-heat emissive and/or heat absorbent. Conversely, the surfaces 11c of the louvers which face the room space D when the louvers are in closed position, are made so as to present a relatively good heat absorbent and heat emissive surface. It is apparent that reflective surfaces 11b may be formed by polishing or otherwise treating the metal to provide a fairly light reflective surface; whereas, heat absorbent surfaces 11b may be formed by etching, painting, or otherwise treating the surfaces with a dull matte finish preferably in the darker color range.

The hollow louvers 11 are interconnected to one another in series to form a part of a closed water circuit heretofore indicated generally at C. More specifically, each louver is connected to each of its two adjacent louvers at opposite ends thereof by virtue of conduit sections 21. As shown in FIG. 6, the conduit sections 21 may be provided with packing glands or O-rings such as indicated at 22 to present a water tight rotatable bearing for receiving an associated end of a hollow pivot 20.

The first and last louvers in the assembly are connected to the outflow and inflow sides 23a and 23b, respectively, of the closed circuit system C. System C is shown diagrammatically as comprising a reservoir tank 24 which may be periodically filled to level through a shut-off valve 25 connected to the main water system, and the tank may be drained for purposes of cleaning, repair, or the like, by a drain plug 26. Water which is circulated through the closed circuit will travel in the direction of the arrows which shows water being pumped (as at 27) through the interconnected louvers, then back to the inflow side 23b of the system, and thence through tank 24, heater 28, and cooler 29 which latter mechanisms are, or may be, thermostatically actuated and controlled according to conventional and well known practices in the art.

In a normal room installation, it is appreciated that substantially the entire system C, including the tank, heater, cooler, and related valves and conduits, would be installed completely out of the way and out of sight within or behind adjacent wall, floor, ceiling, or other screening structures available or especially provided for the purpose.

As heretofore explained, an installation constructed in accordance with the invention may be employed to provide highly efficient, practical and economical means for controlling radiant heat loss and gain between a heat transfer panel (such as the glass window B) and an area space over which it is desired to maintain temperature control (such as heretofore indicated at D). The extreme conditions of use of the unit have already been explained in the earlier sections of this specification. As also earlier indicated there are three features of the invention which combine and cooperate with one another to provide selective means for controlling temperature throughout a wide variety and range of temperature conditions and other conditions of use. Thus, the combined effect of adjustably baffling the heat by moving the louvers to relatively closed or open positions, in conjunction with the oppositely treated exterior and interior surfaces of the louvers so as to reflect heat on the one hand and absorb it on the other hand, and further in conjunction with the capability of being able to circulate alternatively either warm or cold heat exchange fluids through the system render the present control system extremely flexible and yet basically simple and relatively trouble free over the long periods of operating life.

Although the present invention has been described in some detail for purposes of illustration and example to assist in clarity and understanding, it is appreciated that various changes and modifications may be made within the spirit of the invention as limited only by the scope of the claims appended hereto.

I claim:

1. Means for controlling temperature of a room space area comprising in combination: a heat transfer panel; a room space area located to one side of said panel; and a combination adjustable heat baffle and heat exchanger disposed between said panel and said space area; said baffle and exchanger comprising adjustable shutters movable from a closed position, defining a substantially solid heat baffle area between said panel and space, to an open position, defining relatively large areas of open passageways through said baffle and exchanger; the surfaces of said shutters facing said panel when in closed position defining relatively reflective surfaces; the surfaces of said shutters facing said space when in closed position defining relatively non-reflective surfaces; at least some of said shutters being tubular and connected to a source of heat exchange fluid operable to be circulated therethrough.

2. The combination of claim 1 and wherein said tubular shutters are interconnected to one another in a closed circuit of heat exchange fluid; said circuit including heating and cooling means for selectively and alternatively circulating relatively hot and cold fluids through said tubular shutters.

3. The combination of claim 2 and wherein said closed circuit includes hot and cold water as the said hot and cold circulating fluids respectively.

4. The combination of claim 1 and wherein said shutters are formed of hollow metal bodies, and wherein the said substantially poor absorbent and emissive surfaces thereof are defined by reflective metal surfaces, and wherein said relatively good absorbent and emissive surfaces thereof are formed with a matte finish.

5. Means for controlling temperature of a room space area comprising in combination: a heat transfer panel; a room space area located to one side of said panel; and a combination adjustable heat baffle and heat exchanger disposed between said panel and said space area; said combination baffle and exchanger comprising hollow metal louvers mounted for pivotal movement from closed to open positions about parallel vertical axes; said louvers in closed position defining a substantially solid and uninterrupted heat baffle area interposed between said panel and said space; said louvers in open position defining substantially large areas of open passageways extending through said baffle from said panel to said space; the surfaces of said louvers facing said panel when the latter are in closed position defining relatively reflective surfaces; the surfaces of said louvers facing said space area when said louvers are in closed position defining relatively non-reflective surfaces; said hollow louvers being interconnected to one another defining a closed circuit; and means for selectively and alternatively circulating relatively hot or cold fluids through said closed circuit.

6. The combination of claim 5 and wherein said hollow tubular louvers are interconnected to one another in series by conduit means located coincident with said pivotal axes; said conduit means connecting each hollow louver with its adjacent louvers at opposite ends thereof.

7. The combination of claim 6 and wherein there is provided operating means for adjustably opening and closing all of said louvers simultaneously.

8. Means for controlling temperature of a room space area comprising in combination: a heat transfer panel; a room space area located to one side of said panel; and a combination adjustable heat baffle and heat exchanger disposed between said panel and said space area; said baffle and exchanger comprising adjustable shutters movable from a closed position, defining a substantially solid heat baffle area between said panel and space, to an open position, defining relatively large areas of open passageways through said baffle and exchanger; the surfaces of said shutters facing said panel when in closed position defining relatively reflective surfaces; the surfaces of said shutters facing said space when in closed position defining relatively non-reflective surfaces; at least some of said shutters being tubular and interconnected to one another in a closed water circuit; said closed circuit including a water heater and a water cooler located exteriorly of said heat baffle and heat exchanger assembly; said water heater and water cooler alternatively actuatable to circulate either hot or cold water through said tubular shutters in any position of adjustment of the latter.

9. The combination of claim 8 and wherein said adjustable shutters comprise adjustable louvers mounted for pivotal movement about parallel vertical axes; and wherein said louvers are interconnected to one another in series by conduit means located coincident with said pivotal axes and connecting each tubular louver with its adjacent two louvers at opposite ends thereof.

References Cited in the file of this patent

UNITED STATES PATENTS

| | | |
|---|---|---|
| 1,639,474 | Whitmore | Aug. 16, 1927 |
| 2,073,677 | Broderick | Mar. 16, 1937 |
| 2,103,271 | Pratt | Dec. 28, 1937 |
| 2,310,086 | Howard | Feb. 2, 1943 |
| 2,759,574 | Miller | Aug. 21, 1956 |
| 2,952,312 | Young et al. | Sept. 13, 1960 |